United States Patent
Zaid et al.

(12)

(10) Patent No.: US 6,358,424 B1
(45) Date of Patent: Mar. 19, 2002

(54) PROCESS FOR REMOVING CYANIDE ION FROM CADMIUM PLATING RINSE WATERS

(75) Inventors: Gene H. Zaid, Sterling; Beth Ann Wolf, Hutchinson, both of KS (US)

(73) Assignee: Jacam Chemicals, L.L.C., Sterling, KS (US)

( * ) Notice: Subject to any disclaimer, the term of this patent is extended or adjusted under 35 U.S.C. 154(b) by 0 days.

(21) Appl. No.: 09/551,739

(22) Filed: Apr. 18, 2000

(51) Int. Cl.[7] .................................................. C02F 1/58
(52) U.S. Cl. ........................ 210/724; 210/726; 210/904; 423/367
(58) Field of Search ................................. 210/723, 724, 210/726, 727, 904; 423/367

(56) References Cited

U.S. PATENT DOCUMENTS

| | | | | |
|---|---|---|---|---|
| 4,312,760 A | * | 1/1982 | Neville | 210/724 |
| 5,106,508 A | | 4/1992 | Scwitzgebel | 210/712 |
| 5,160,632 A | * | 11/1992 | Kleefisch et al. | 210/724 |
| 5,647,996 A | * | 7/1997 | Yablonsky et al. | 210/710 |

FOREIGN PATENT DOCUMENTS

| | | | | |
|---|---|---|---|---|
| JP | 50-656 | * | 1/1975 | ................ 210/904 |
| JP | 56-130294 | | 10/1981 | |

OTHER PUBLICATIONS

Busch et al.; Ion–Precipitate Flotation of Iron–Cyanide Complexes; Journal WPCF, vol. 52, No. 12; pp. 2925–2930 (Dec., 1980).

Hammen et al.; Separation and Removal of Metal Cyanides; Proceedings of Hazmacom '95, Hazardous Materials Management Conference and 1995, 435–445.

* cited by examiner

*Primary Examiner*—Peter A. Hruskoci
(74) *Attorney, Agent, or Firm*—Hovey Williams LLP

(57) ABSTRACT

An improved process for the removal of cyanide ion from aqueous dispersions (e.g., aqueous spent cadmium plating solutions or plating rinse water solutions) is provided wherein a source of $Fe^{+2}$ ion is reacted with a cyanide ion-containing aqueous dispersion at low pH to form a relatively insoluble reaction product complex, whereupon the reaction product is removed by filtration or the like. In preferred practice, the pH of a waste water is adjusted to a level of up to about 2, followed by the addition of ferrous ammonium sulfate.

25 Claims, No Drawings

PROCESS FOR REMOVING CYANIDE ION FROM CADMIUM PLATING RINSE WATERS

BACKGROUND OF THE INVENTION

1. Field of the Invention

The present invention is broadly concerned with an improved method for removing cyanide ion from aqueous dispersions. More particularly, the preferred method is especially directed to cyanide ion removal from dispersions or solutions produced by the gold mining and electroplating industries, and involves reacting such dispersions at a very low pH with $Fe^{+2}$ ion so as to complex the cyanide ion and permit easy separation thereof by filtration or other conventional techniques.

2. Description of the Prior Art

Cyanide is used as a reaction in the plating, gold mining and chemical industries and is also generated in the coke-making process. The cyanide from all of these sources eventually becomes an aqueous waste product. However, cyanide is extremely toxic and must be essentially removed from waste water before the water can be legally discharged. For example, in cadmium plating operations, the plating solution contains substantial quantities of sodium cyanide. After parts are cadmium plated in such a solution, they are rinsed in water. This rinse water inevitably becomes contaminated with cyanide ion at various levels, ranging from a few ppm up to a million ppm or more. Likewise, modern large scale gold mining operations now employ the cyanide heap leeching process for gold extraction. This process allows economical recovery of gold from relatively low grade ores. The process involves the oxidative dissolution of native metal in the presence of aqueous cyanide to produce aurocyanate, which is then treated to recover the gold. The cyanide leech process thus produces large quantities of cyanide-containing waste streams.

Various proposals have been advanced in the past for removing cyanide ion from contaminated waste waters. Busch et al., *Ion-Precipitate Flotation of Iron-Cyanide Complexes,* J. WPCF, 52(12):2925–2930 (1980) describe a process for removing ferricyanide using an ion-precipitation process with surfactant. These authors report that pH has very little effect on the recovery of ferricyanide. Hammen et al., *Separation and Removal of Metal Cyanides,* Proceedings of Hazmacon '95, Hazardous Materials Management Conference (1995) describe a cyanide removal process using a modified porous silica anion-exchange media. U.S. Pat. No. 5,106,508 describes a process for heavy metal and cyanide removal from plating process waste streams wherein cyanide is oxidized by hypochlorite at pH 11.5.

These prior art approaches to the problem of cyanide removal suffer from problems of complexity and cost. This is especially significant when it is considered that relatively large volumes of waste waters must be treated having varying cyanide ion concentrations.

SUMMARY OF THE INVENTION

The present invention overcomes the problems outlined above and provides an improved method for removing cyanide ion from aqueous dispersion or solutions. Broadly speaking, the method involves reacting a cyanide ion-containing aqueous dispersion with $Fe^{+2}$ ion at a very low peak pH of up to about 2 in order to form an iron-cyanide ion reaction product. This product is then conventionally separated from the dispersion by filtration, centrifugation or decantation.

In typical operations, the aqueous dispersion is a solution such as that derived from plating rinse waters. In such a case, the first steps is to normally lower the pH to a level of up to about 2 by the addition of acid (e.g., HCl), followed by the addition of an $Fe^{+2}$ ion source (e.g., ferrous ammonium sulfate). This results in the formation of a deep blue reaction product $Fe_4[Fe(CN)_6]_3$ which is relatively insoluble. The reaction product can then be separated.

DETAILED DESCRIPTION OF THE PREFERRED EMBODIMENT

The preferred cyanide ion removal process of the invention involves the reaction of cyanide ion in an aqueous dispersion or solution with $Fe^{+2}$ ion at very low pH levels of up to about 2. It is believed that the overall reaction proceeds as follows in the presence of $H^+$:

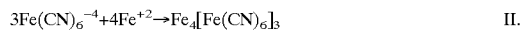

The method of the invention can be varied in a number of ways without departing from the principles of the invention. For example, if a given aqueous waste stream has a pH of below about 2 as received, there is of course no need to adjust the pH to this level and therefore the addition of $Fe^{+2}$ ion is directly made. More commonly though, an incoming waste water will require pH adjustment. This can be done by the addition of virtually any acid (e.g., HCl, HF, $H_2SO_4$, $HNO_3$, $H_3PO_4$ organic acids (such as acetic or citric) and mixtures of the foregoing) organic acids either before, at the time of or after the addition of the $Fe^{+2}$ ion source. The reaction pH should be up to about 2, more preferably up to about 1.5, and most preferably around 1.0.

The process of the invention can be used to treat cyanide ion-containing waste waters having a wide variation in cyanide ion contamination. This can range from just a few ppm up to about $10^5$ ppm or more of cyanide ion in the case of rinse waste waters. However, the invention may also be used to treat spent Cd plating solutions or other highly contaminated waste waters. The reactions are most usually carried out at room temperatures (22–27° C.) and at atmospheric pressure. A variety of $Fe^{+2}$ ion sources can also be used, such as those selected from the group consisting of ferrous ammonium sulfate, ferrous sulfate, ferrous chloride and mixtures thereof. The $Fe^{+2}$ ion source is normally added at a level to achieve a substantial molar excess of $Fe^{+2}$ ion to cyanide ion, usually by a factor of 3 or more.

At the end of the process, essentially all of the undesirable cyanide ion is removed. However, there may be residual iron left in the waste water. This can be removed by adding a base such as sodium hydroxide to the dispersion or solution in order to raise the pH thereof to essentially neutral and to react with such residual iron. The resultant reaction can then be filtered. This final cleanup process can be repeated for as many times as necessary to achieve the degree of iron removal deemed necessary.

In order to demonstrate the invention, a series of tests were carried out using 1000 ml aqueous samples containing 3, 5, 12, 500, 1000, 10,000, and 50,000 ppm cyanide ion, respectively. Two ml of hydrochloric acid (28%) and 1.5 g ferrous ammonium sulfate were added to each 1000 ml sample, resulting in a pH of below about 2. In all cases, a deep blue color rapidly developed, demonstrating the presence of $Fe_4[Fe(CN)_6]_3$. The samples were allowed to stand for a short time (e.g., about 2 minutes), whereupon the samples were filtered through 20μ filter paper to remove blue-colored complex. Next, the filtered samples were treated with 0.5 ml NaOH (50%) to elevate the sample pH to about neutral and to react any residual iron. The resultant precipitate was then filtered. This neutralization step can be repeated if desired. In all cases, substantially the entirety of the cyanide ion content of the samples was removed.

In comparative tests, using less acid and sample pHs above 2, the blue iron complex did not develop and consequently cyanide ion was not separated.

We claim:

1. A method of removing cyanide ion from waste water comprising the steps of:

provided waste water containing cyanide ion and having a pH of below about 2;

adding a quantity of an $Fe^{+2}$ ion source to said waste water, and causing said $Fe^{+2}$ to react with said cyanide ion at said pH to form a reaction product $Fe_4[Fe(CN)_6]_3$; and separating said reaction product from said waste water.

2. The method of claim 1, said providing step including the step of adjusting the pH of the waste water to a pH of below about 2.

3. The method of claim 2, said adjusting step comprising the step of adding acid to said waste water.

4. The method of claim 3, said acid being added prior to the addition of said $Fe^{+2}$ ion source.

5. The method of claim 3, said acid being added substantially simultaneously with the addition of said $Fe^{+2}$ ion source.

6. The method of claim 3, said acid being added after said addition of said $Fe^{+2}$ ion source.

7. The method of claim 1, said waste water being selected from the group consisting of cadmium plating solutions, cadmium plating rinse water and mixtures thereof.

8. The method of claim 1, said waste water having up to about $10^5$ ppm of cyanide ion therein.

9. The method of claim 1, said pH being up to about 1.5.

10. The method of claim 1, said $Fe^{+2}$ ion source selected from the group consisting of ferrous ammonium sulfate, ferrous sulfate and mixtures thereof.

11. The method of claim 10, said source being ferrous ammonium sulfate.

12. The method of claim 1, said separating step comprising filtering the waste water to remove said reaction product.

13. The method of claim 1, including the step of adding base to said waste water after said separating step.

14. The method of removing cyanide ion comprising the steps of reacting $Fe^{+2}$ ion with a cyanide ion compromising waste water at a pH of below about 2 to form an iron-cyanide ion reaction product $Fe_4[Fe(CN)_6]_3$, and ten separating said reaction product from the waste water.

15. The method of claim 14, including the step of adding an $Fe^{+2}$ ion source to said cyanide-containing waste water.

16. The method of claim 15, said $Fe^{+2}$ ion source being added to said waste water after the pH of the dispersion has been adjusted to a level of below about 2.

17. The method of claim 15, said $Fe^{+2}$ ion source being added to said waste water while the waste water has a pH of above 2, and thereafter lowering the pH of the waste water to a level of below about 2.

18. The method of claim 14, said waste water being selected from the group consisting of cadmium plating solutions, cadmium plating rinse water and mixtures thereof.

19. The method of claim 14, said waste water up to about $10^5$ ppm of cyanide ion therein.

20. The method of claim 14, said pH being up to about 1.5.

21. The method of claim 14, said $Fe^{+2}$ ion source selected from the group consisting of ferrous ammonium sulfate, ferrous sulfate and mixtures thereof.

22. The method of claim 21, said source being ferrous ammonium sulfate.

23. The method of claim 14, said separating step comprising filtering the waste water to remove said reaction product.

24. The method of claim 14, including the step of adding base to said waste water after said separating step.

25. A method of removing cyanide ion from cyanide ion-containing aqueous solutions or dispersions produced in the gold mining, chemical, electroplating or coke-making industries, comprising the steps of:

providing an aqueous solution or dispersion produced in the gold mining, chemical, electroplating or coke-making industries containing cyanide ion and having a pH of below about 2;

adding a quantity of all $Fe^{+2}$ ion source to said aqueous solution or dispersion and causing said $Fe^{+2}$ to react with said cyanide ion at said pH to form a reaction product $Fe_4[Fe(CN)_6]_3$; and separating said reaction product from said aqueous dispersion or solution.

* * * * *